July 21, 1953  E. C. HORST, JR  2,645,893
HOP PICKING MACHINE
Filed May 1, 1950  4 Sheets-Sheet 2

INVENTOR.
Emil Clemens Horst Jr.
BY

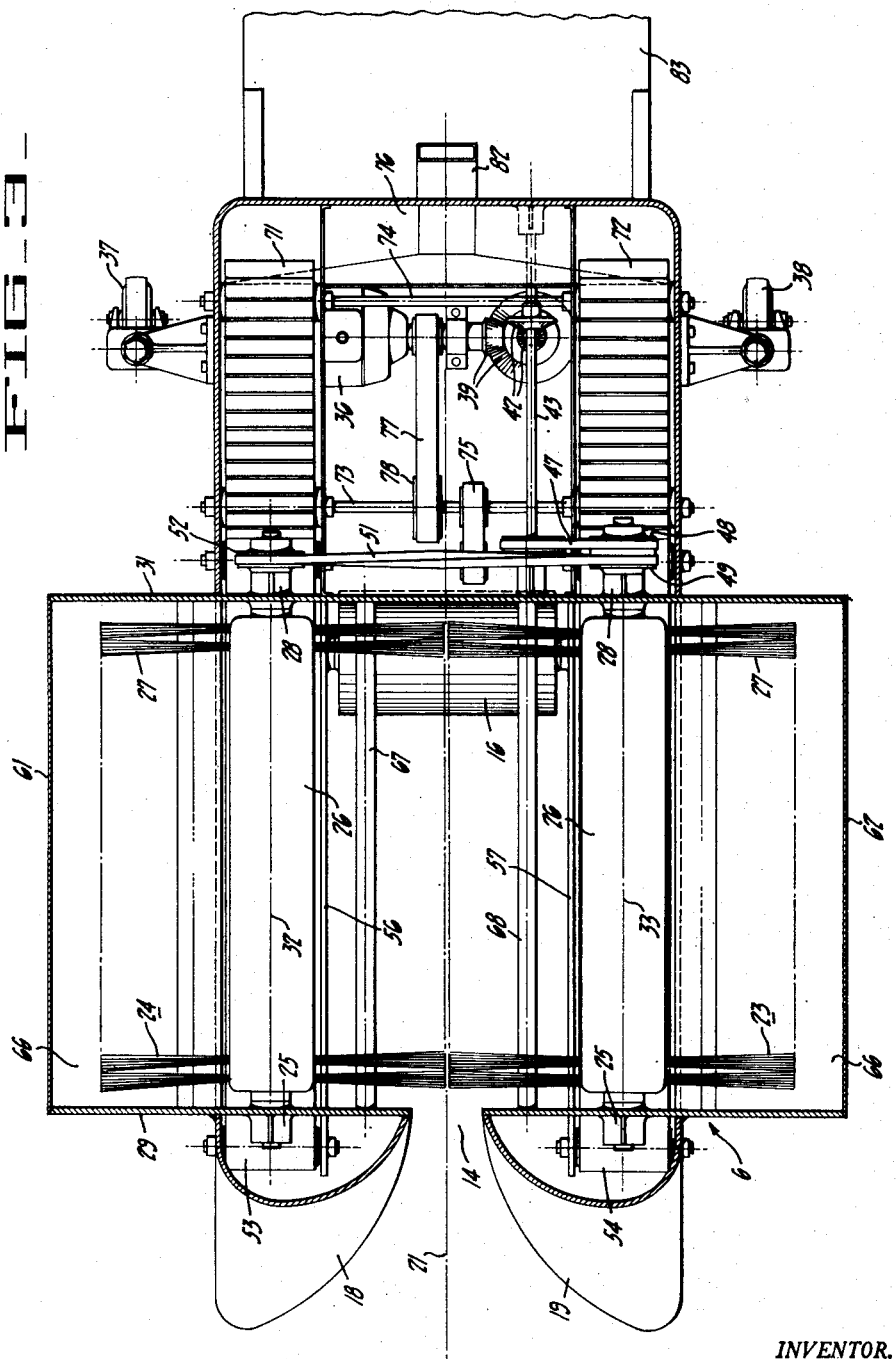

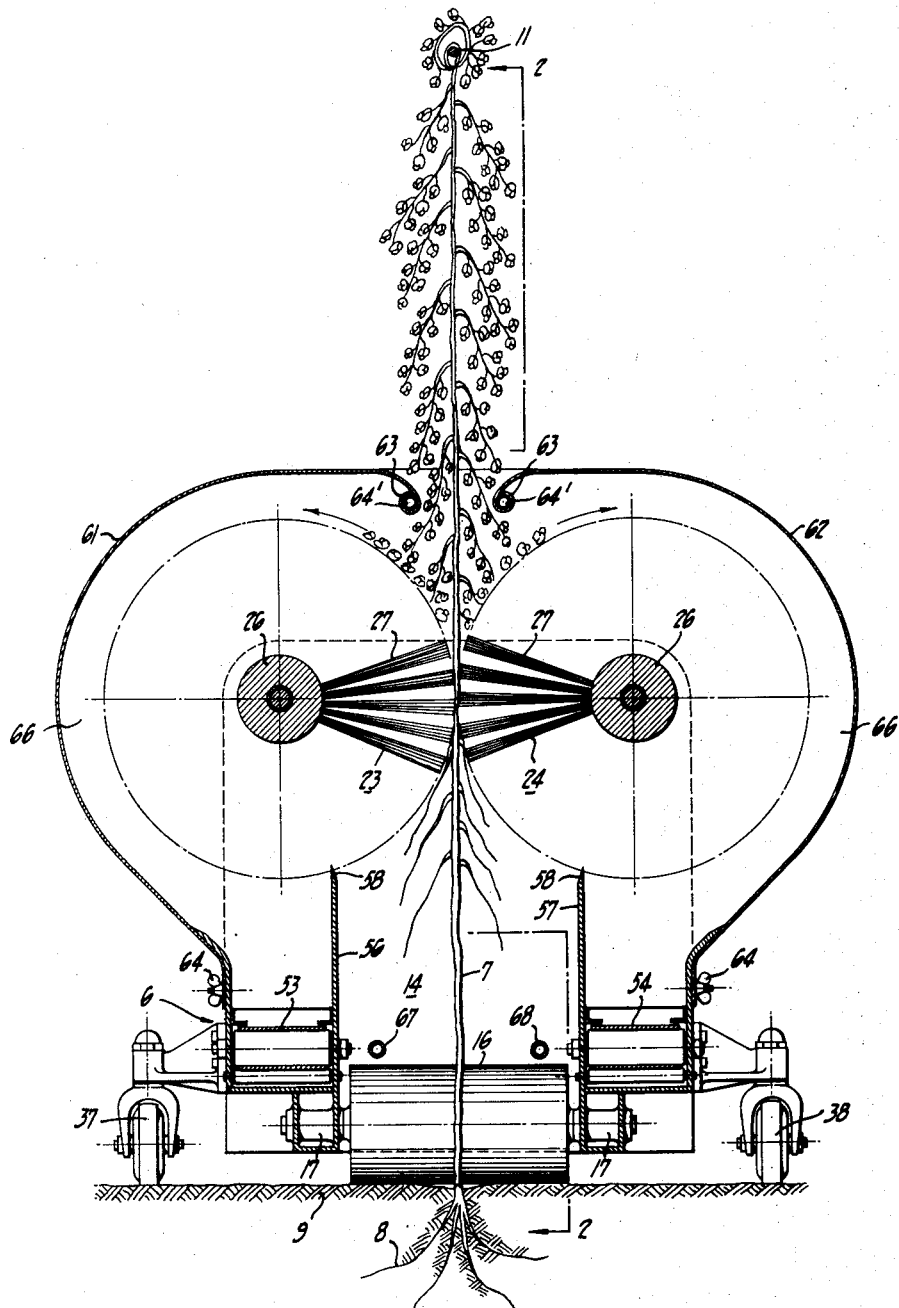
FIG_4_

Patented July 21, 1953

2,645,893

UNITED STATES PATENT OFFICE 2,645,893

HOP PICKING MACHINE

Emil Clemens Horst, Jr., San Francisco, Calif., assignor to E. Clemens Horst Company, San Francisco, Calif., a corporation of New Jersey Application May 1, 1950, Serial No. 159,192

5 Claims. (Cl. 56—126)

My invention relates to machines especially useful for picking hops in the field while the vines are still growing therein and is especially concerned with a machine of that type as shown in my Patent No. 2,447,122, issued August 17, 1948.

The historical process of picking hops with machinery has involved manually severing the hop vines from their growing positions on the trellis structure in the field and bringing them to a stationary machine. But there has developed in recent years a harvesting method which involves driving a machine into the field along and down a row of growing hop vines while they are still tied to the trellis. The machine pulls the vines downwardly through it as the machine advances, the hops being stripped from the vine as it passes through the machine. The root remains intact in the soil and the stripped but unsevered vine then can wither naturally. The growing cycle of the plant is thus not interrupted by severance of the portion above the ground from the root.

While successful machines for field harvesting have been made, they have been largely adaptations of stationary equipment. They require a rather precise guidance of the machine along the row of hop vines in the field and do not possess a wide range of accommodation or latitude of operation to cope with variance in vine planting and growth and to take into account usual carelessness on the part of machine operators.

It is therefore an object of my invention to provide a hop picking machine especially designed as a portable unit and especially useful in accommodating variations in the positioning and size of the growing hop vines and also designed with a wide degree of latitude for accommodating variations in the operation of the machine itself.

Another object of the invention is to provide a generally improved hop picking machine.

A further object of the invention is to provide a hop picking machine of the field harvesting type in which substantially all of the hops stripped from the vines are retained in the machine and are not lost upon the ground.

Other objects together with the foregoing are attained in the embodiment of the invention described in the accompanying description and illustrated in the accompanying drawings, in which Figure 1 is a side elevation of a hop picking machine constructed in accordance with my invention and disclosed as it appears advancing along a row of hops growing in a field.

Figure 3 is a cross-section on the plane indicated by the line 3—3 of Figure 2.

Figure 4 is a cross-section, the plane of which is indicated by the line 4—4 of Figure 2.

Figure 1:
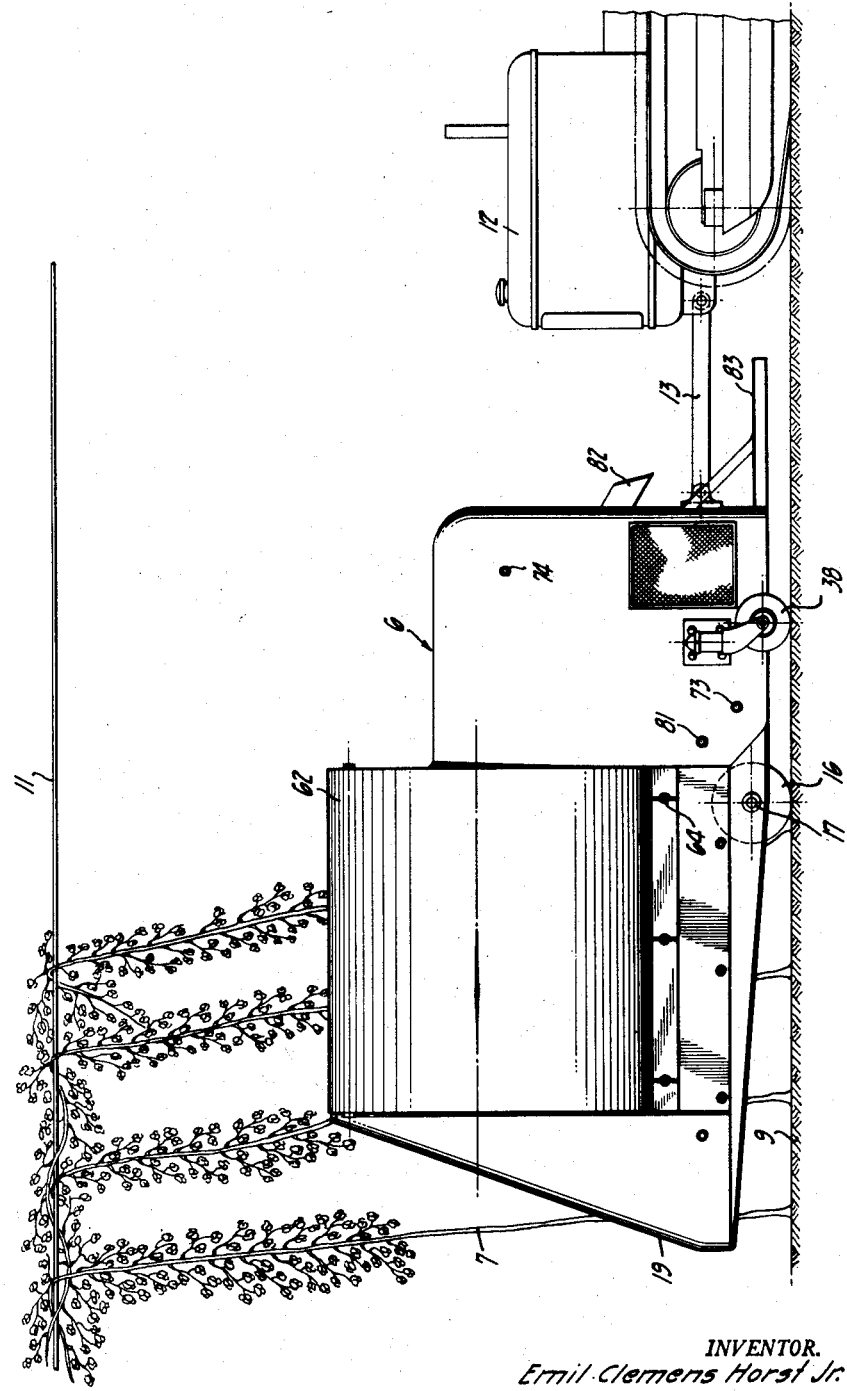
Figure 2:
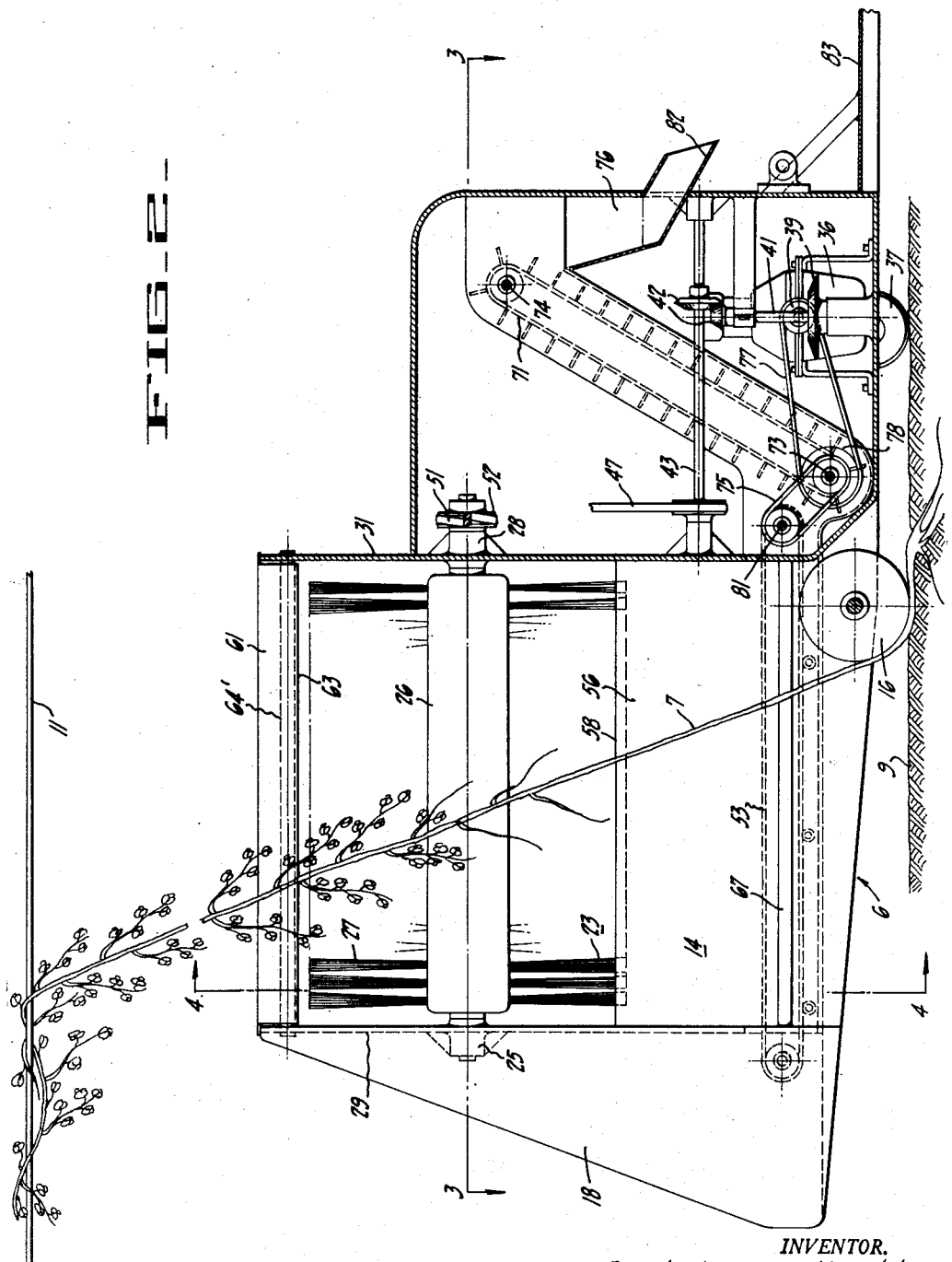
Figure 2 is a cross-section on a longitudinal, vertical plane of the machine shown in Figure 1 but drawn to an enlarged scale.

While the hop picking machine of my invention is susceptible to embodiment in numerous different forms depending on various engineering and economic considerations, its fundamental mode of operation and its salient characteristics are incorporated in the structure illustrated and described. In this device, there is provided a portable frame 6 adapted to be utilized in a hop field which is semi-diagrammatically illustrated. In the hop field, the hop vines 7 extend from their root structure 8 in the ground 9 in a generally vertical direction or in an upright direction and in file to be supported by a horizontal wire or cord 11 which supports them as they grow. A field is made up of a number of such files or rows of hop vines similarly trained upon a trellis or supporting member.

The frame 6 is of a convenient size and extent to travel in the field along or down a row such as illustrated taking one of the rows of hop vines at a time for harvesting. The frame 6 is propelled by a pusher tractor 12 connected to it by a push bar 13 allowing some flexibility of motion and is arranged, especially as shown also in my mentioned patent, with a central passageway 14 extending from the bottom of the machine to the top of it and open at the forward portion. Disposed within the machine and located at the rearward end of the passageway 14 is a roller 16 normally engaging the ground and mounted in journals 17 on the frame 6. The position and effect of the roller are such that as the tractor 12 advances the frame 6, the roller 16 overlies and bears down upon the hop vine 7, thus pulling it generally downwardly through the passageway 14 as the frame 6 advances. The machine pulls the vine from the trellis or wire 11 and draws the upper part entirely through the passageway 14, concurrently depriving it of its hop flowers. The stripped vine is left lying upon the ground. As it is still attached to its root, it is free to dry naturally and to grow up again the following season.

In order to guide the successive ones of the vines 7 into the passageway 14, despite inaccuracies in the piloting of the frame 6 along the row, the forward end of the frame is provided with a pair of relatively blunt deflector guards 18 and 19 symmetrically disposed about the central axis 21 of the passageway 14 which is also the central axis of the machine. The deflectors lead each vine no matter where intercepted into the central passageway in an approximately vertical position.

To strip the hop flowers from the vine as it enters and passes through the passageway 14 during the advance of the machine, I provide a pair of rotatable brushes 23 and 24. These brushes are identical. Each of them preferably includes a generally solid hub 26 provided with a plurality of bundles of radial bristles 27 extending outwardly from the hub for a substantial distance and extending axially along the hub for a major part of the length of the machine frame. The brushes amount to circular cylinders made up of relatively stiff bristles and are somewhat comparable to the common street-sweeping bristle brushes.

The hubs 26 are mounted in journals 25 and 28 respectively. These journals are supported in a forward wall 29 and a rearward wall 31 extending upwardly from and transversely of the machine frame 6. The arrangement is such that the axes 32 and 33 of the brushes are parallel to each other and are parallel to the axis 21 of the machine, also being in a generally horizontal plane. The axes are spaced transversely apart a distance such that the ends of the bristles 27 are substantially tangent or substantially touch each other with portions of the brushes overlying the passageway 14 and in effect forming a top closure for the passage.

The adjustment or positioning of the rotary brushes is such that the bristle ends come as close as is practicable to each other. In some instances, they may actually touch, or some of them may touch, while in other instances or others of them may be slightly spaced apart, but the general aim is to have the peripheral surfaces of the two brushes as nearly tangent as possible along the brush length. The brushes as so mounted therefore constitute in effect a horizontal transverse barrier adjacent the top of the passageway 14 so that material above the brushes does not pass downwardly therebetween to fall upon the ground, inasmuch as the passage 14 is substantially clear or substantially uninterrupted between the brushes and the ground, but rather is retained above the brushes and away from the passageway 14 beneath them.

As the frame 6 is advanced, the hop vine 7 is brought or pulled into the passageway 14 and into and between the brushes 23 and 24. One component of the vine motion is generally downwardly between the brushes or tangentially with respect to them, but since the frame 6 is also advancing as the vine 7 is being pulled downwardly, another component of the motion is relatively rearwardly of the frame 6 or axially of the brushes 23 and 24.

In carrying out my invention, I prefer to drive or rotate the brushes 23 and 24 in order to expedite their action in stripping or removing the hop flowers or buds from the hop vine while permitting the major leaves and the vine stem or stalk to pass between the brush bristles. The spacing or arrangement and the flexibility of the bristle ends, although normally nearly touching, is sufficient to permit the stalk and much of the leafy material to go on through, while the relatively globular or spherical hop buds or flowers are too large to pass therebetween.

To drive the brushes and also to provide a source of power for other power-driven instrumentalities on the frame 6, I preferably mount an engine 36, such as an internal combustion engine, on part of the frame 6 adjacent the rear section thereof, and because of this weight in this area, I also provide outrigger caster wheels 37 and 38 at opposite sides of the frame to assist the roller 16 in affording an adequate and stable although three-cornered and consequently universal support therefore.

The engine 36 operates at substantially a constant speed independently of the speed of advance of the frame 6 and through a pair of bevel gears 39 rotates a vertical shaft 41 in turn rotating or driving another pair 42 of bevel gears. Driven by the latter pair 42 of gears is a longitudinal shaft 43 appropriately journaled in the frame 6 and driving a belt 47 also engaged with a pulley 48 on the rearward outboard end of the drum 26 for the brush 24. Beside the pulley 48 is a similar pulley 49 driving through a cross belt 51 trained around a pulley 52 on the drum 26 for the brush 23.

The directions of motion of the engine 36 of the connecting mechanisms and of the belt 51 are all such that the brushes 23 and 24 revolve with their tangent or substantially touching portions moving generally upwardly all along the vertical plane of the axis 21 of the frame 6. That is, as seen in Figure 4, the left-hand brush 23 rotates in a counterclockwise direction whereas the right-hand brush 24 rotates in a clockwise direction. Since the relative motion of the vine 7 is generally downward as seen in Figure 4 and since the brush motion is relatively upward, the brushes are quite effective to remove the hop flowers.

The bristles of the brushes, while each of them is separate and distinct, form a sufficiently continuous supporting surface so that the detached hop flowers are carried along by the brushes over the top of their path of revolution and downwardly along the outside or remote side thereof for disposition in hop conveyors 53 and 54. These are identical and are disposed on opposite sides of the central axis 21. They conveniently take the form of conveyor belts disposed substantially beneath the brush axes 32 and 33 respectively. The conveyors are separated from the central passageway 14 by side guards or plates 56 and 57 extending from a point near the ground to a terminus 58 very close to the periphery of the brushes 23 and 24, thereby substantially completing a division between the passageway 14 and the remaining part of the frame 6. The walls 56 and 57 thus afford a sharp demarcation of the passageway 14 on either side thereof.

Since some of the severed hop flowers might otherwise be lost, and also in order to protect the brushes, I provide housings 61 and 62 on opposite sides of the machine frame 6. Conveniently, each of the housings has a curved or rolled upper terminus 63 wrapped about a tube 64' extending lengthwise of the frame and which in fact can be a roller as it serves as a guard or guide for the hop vine 7 entering the machine. The housing extends generally circumferentially around and spaced from the adjacent one of the brushes 23 and 24 to a fastening 64 on the frame near the adjacent one of the conveyors 53 and 54. The housings 61 and 62 overlap the transverse walls 29 and 31 which have appropriate contours so that a general enclosure is provided. By removing or loosening the fastenings 64 and utilizing the terminus 63 as a hinge, an operator can swing the housing 61 out of the way to examine or work upon the machinery.

The space 66 between the housing and the brush periphery is a passage for the severed hop flowers so that they pass around with the brushes and finally fall by gravity upon the conveyors 53 and 54. They are kept from re-entering the passage 14 by the walls or plates 56 and 57. In this way, the brushes themselves are utilized as part of the barrier between the enclosing housings and the passageway 14 and no central guide between the brushes and the ground is necessary. The passage 14 can therefore be made relatively wide so that reasonable deviations of the machine from a true course down the row or file are immaterial. If the deviations are large, the vine 7 is additionally guided in the passageway 14 by longitudinal rollers 67 and 68 so that despite irregularities in the ground which deflect the machine, or despite the erratic operation by the operator and despite variations in size and position of the vines, they all eventually enter the central portion of the machine properly and pass downwardly between the substantially tangent parts of the brushes whereat their flowers are stripped off and are pulled around the outside of the brushes through the passageways 66 to the respective conveyors 53 and 54. The vine is left upon the ground and the hop flowers upon the conveyor belts 53 and 54 are carried rearwardly.

Adjacent the rearward ends of the conveyors, there are provided elevator flights 71 and 72 mounted on cross shafts 73 and 74 spanning the frame 6 and located with the lower ends of the elevator flights beneath the rearward ends of the conveyors and with the upper ends of the elevator flights above a hop chute 76. The elevator flights are driven by a belt 77 engaged with the shaft of the engine 36 and also with a pulley 78 on the shaft 73. From this shaft also a belt 75 drives a cross shaft 81 for propelling the conveyors 53 and 54. Thus the hop flowers are carried to the rear and to the upper portion of the frame 6 and are dumped by gravity into the hopper 76. The contour of the hopper is such that the hops fall by gravity to a chute 82 extending to the outside of the housing and located at a suitable spot above the bottom 83 of a sacker platform which forms part of the frame 6. The discharged hop flowers are put into sacks and are periodically removed for cleaning and for further processing.

I claim:

1. A hop picking machine comprising a frame adapted to be advanced along a row of hop vines growing in a field, said frame defining a passageway extending vertically therethrough and open at the forward end thereof, said passageway being substantially symmetrical on either side of a longitudinal vertical plane bisecting said passageway, a ground engaging roller mounted on said frame at the rear of said passageway for pulling said vines downwardly through said passageway as said frame is advanced, a pair of circular cylindrical brushes each including a hub having a journal at each end and having a plurality of bristles extending outwardly from and axially along said hub, the peripheral surface of each of said brushes forming a substantially continuous circular cylindrical envelope and being substantially tangent to said vertical plane, said hub journals being mounted in corresponding bearings affixed to said frame for rotation of said brushes in a direction opposite to the motion of said hop vine through said passageway, side plates on said frame on opposite sides of said passageway and extending vertically from each side of said roller substantially to intersect said brush envelopes, and defining with the bottom portion of said envelopes a substantially uninterrupted passageway for the passage of said hop vine, and means for driving said brushes.

2. A hop picking machine comprising a frame, said frame defining a passageway extending vertically therethrough and open at the forward end thereof, a ground engaging roller mounted on said frame at the rear of said passageway for pulling hop vines downwardly through said passageway, a pair of brushes having bristles arranged to define substantially continuous circular cylindrical envelopes, said brushes being mounted for opposite rotation and being in substantial tangency with each other for plucking and carrying upward and around the periphery of said brushes the leaves and hop flowers of said hop vines, a pair of housing covers disposed on opposite sides of said frame and each defining with the periphery of the adjacent brush a generally circumferential passageway for directing the passage of said leaves and hop flowers, hop conveyors at the lower end of said passageway for receiving and carrying away said leaves and hop flowers, side plates extending vertically upward from said conveyors substantially to intersect said brush envelopes and defining between said side plates a substantially uninterrupted passageway for the stripped hop vine emerging from said brushes at substantially a line of tangency of said brush envelopes, and means for driving said roller, said brushes and said conveyors.

3. A hop picking machine comprising a frame, a ground engaging roller mounted on said frame for pulling a hop vine downwardly as said frame is advanced, a pair of side plates mounted on said frame and extending vertically upward from each side of said roller to define a substantially uninterrupted passageway therebetween, a pair of circular cylindrical brushes symmetrically disposed above said plates, each brush substantially touching the top of the adjacent side plate and said brushes being in substantial tangency with each other, and being mounted on said frame for upward motion at said point of tangency for plucking the leaves and flowers of said hop vine and being effective to maintain said hop vine in a substantially central location with respect to the upper portion of said passageway, and means for conducting away said plucked leaves and flowers.

4. A hop picking machine comprising a frame, a pair of hop conveyors mounted on said frame at opposite sides thereof, a pair of circular cylindrical bristle brushes mounted on said frame for upward and outward rotation about horizontal longitudinal parallel axes, each of said axes being substantially vertically above the corresponding one of said conveyors and being spaced for substantial tangency of said brushes, a pair of side plates each extending vertically upward from the adjacent inner side of said conveyors to intercept the periphery of the adjacent brush, a pair of housing covers disposed on opposite sides of said frame and each defining with the outer side of the adjacent conveyor and the periphery of the adjacent brush and side plate a generally circumferential passageway, and means for driving said brushes and said conveyors.

5. A hop picking machine comprising a frame adapted to be advanced along a row of hop vines growing in a field, said frame defining a passageway extending vertically therethrough and open at the forward end thereof, a pair of circular cylindrical bristle brushes mounted on said frame with the envelopes of said bristles substantially touching along a longitudinal horizontal line of tangency effective to close said passageway to the further downward motion of the hop flowers of said vines, and to hold said vines substantially central of said passageway, means for rotating said brushes upwardly at the line of tangency, a pair of housing covers disposed on opposite sides of said frame and each defining with the periphery of the adjacent brush a generally circumferential passageway for conducting the hop flowers urged through said passageway by said brushes, a pair of side plates mounted on said frame and extending from each side of said roller vertically upward to intersect the adjacent of said brushes for deflecting downward said hop flowers discharging from said circumferential passageway.

EMIL CLEMENS HORST, Jr.

References Cited in the file of this patent

UNITED STATES PATENTS

| Number | Name | Date |
|---|---|---|
| 524,333 | Mills et al. | Aug. 14, 1894 |
| 1,007,504 | Tanner | Oct. 31, 1911 |
| 1,273,814 | Berry | July 30, 1918 |
| 1,848,273 | Ryder | Mar. 8, 1932 |
| 2,447,122 | Horst | Aug. 17, 1948 |